Figure 9:
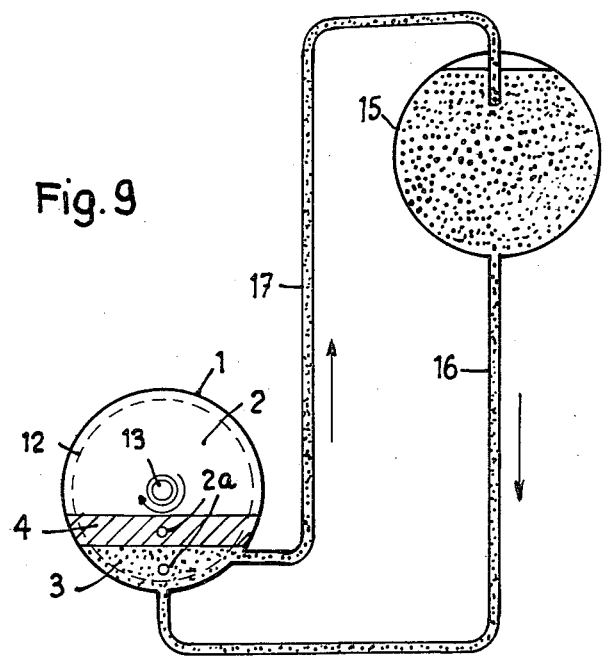

Oct. 2, 1956 R. SIGNER 2,765,298
PROCESS FOR THE SEPARATION OF MIXTURES OF SUBSTANCES
Filed Nov. 5, 1951 3 Sheets-Sheet 1
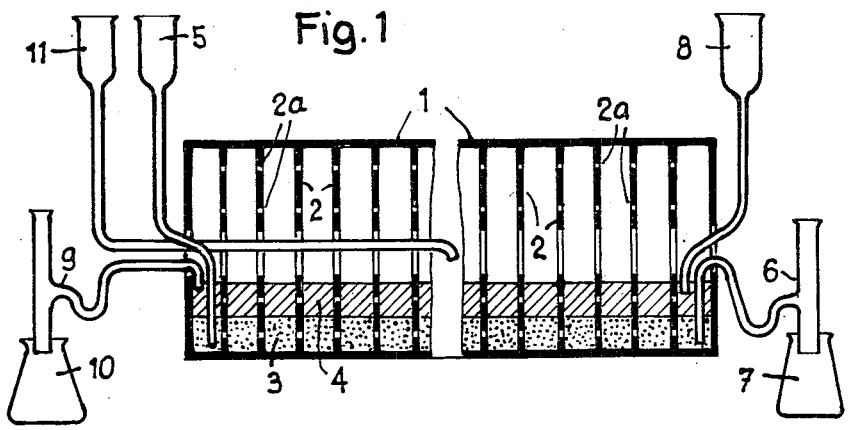
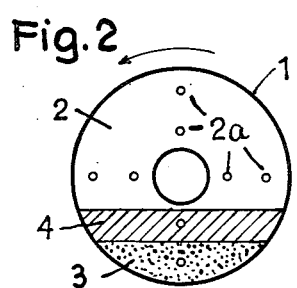
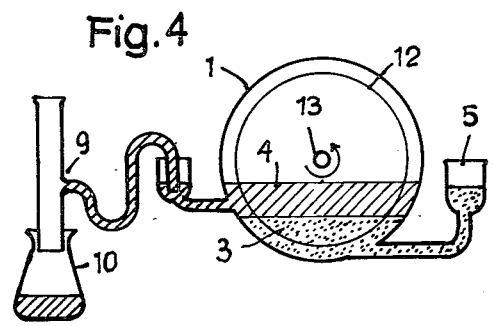
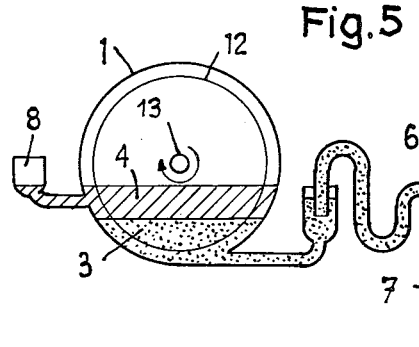
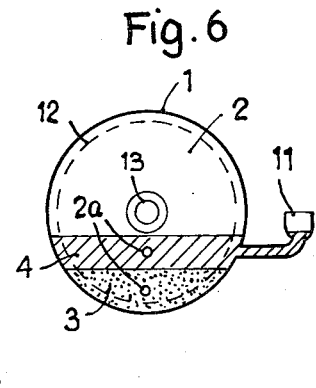
Inventor:
Rudolf Signer
By Henderoth, Lind + Ponack
Attorneys.

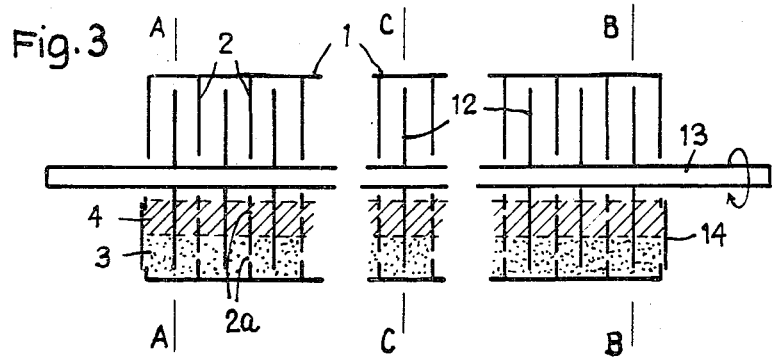
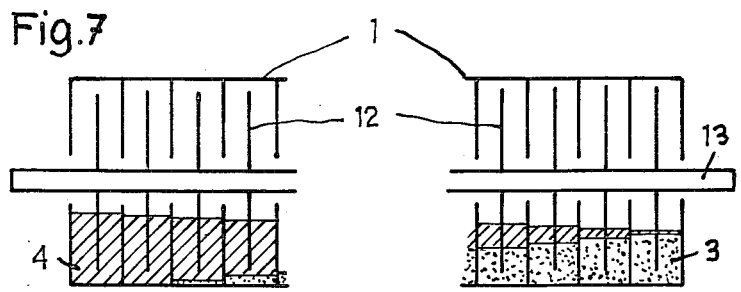
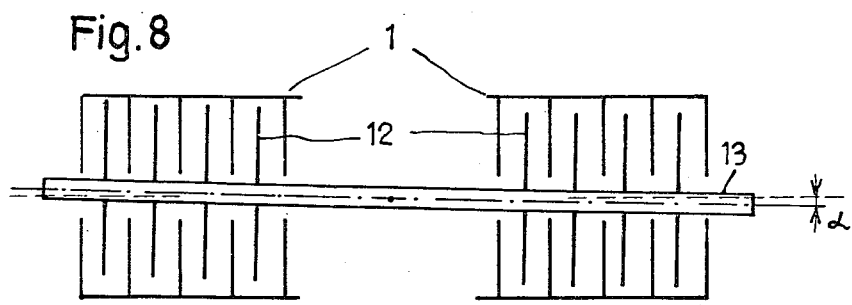

Oct. 2, 1956  R. SIGNER  2,765,298
PROCESS FOR THE SEPARATION OF MIXTURES OF SUBSTANCES
Filed Nov. 5, 1951  3 Sheets-Sheet 3

Inventor.
Rudolf Signer
By
Stenderoth, Lind & Ponack
Attorneys.

United States Patent Office 2,765,298
Patented Oct. 2, 1956

2,765,298

PROCESS FOR THE SEPARATION OF MIXTURES OF SUBSTANCES

Rudolf Signer, Gumligen, Switzerland

Application November 5, 1951, Serial No. 254,950

5 Claims. (Cl. 260—120)

The present invention is concerned with a method of separating mixtures of substances by counter-current distribution between two liquid immiscible phases and with an apparatus for carrying out this process.

In a separating funnel, mixtures are separated more or less completely by means of two liquid phases which are not miscible with each other. If the components of a mixture have similar partition coefficients, many systematically combined shaking operations are necessary to bring about complete separation. There have already been disclosed numerous ingenious pieces of apparatus with which a limited quantity of material is discontinuously extracted with repeatedly new portions of both phases. Furthermore, there are already known many kinds of apparatus working on the counter-current extraction principle, these being supplied continuously with the mixture to be separated and with two immiscible liquid phases which continuously flow out of the apparatus again and one of which contains one substance or a group of substances whilst the other contains the other substance or group of substances to an increasing extent. Most of these types of apparatus comprise a large number of alternately arranged chambers with agitating or stirring mechanisms and with separating chambers. The liquid phases flowing through this apparatus are alternately mixed in a stirring chamber and again segregated in an adjacent separating chamber. This alternation of thoroughly mixing and separating is repeated as many times as there are chambers. Apparaus of this kind are exceedingly complicated and their performance is not satisfactory. The more intensive the stirring, the more difficult becomes the systematic advancing of a particular phase in counter-current to the other. The less intensive the stirring, the more incomplete is the adjustment of the partition equilibrium in a chamber and the separating action of the entire apparatus.

It has now been found that the difficulties known heretofore may be completely overcome if the two phases are brought into intimate contact in adjacently arranged chambers or zones provided with apertures for transport of the phases, at the same time maintaining a substantially uninterrupted phase interface in the individual chambers, one or both phases flowing in horizontal direction from one chamber into the other.

The upper or the lower phase may be left at rest whilst the other one moves more or less rapidly, or both phases may move with identical or different velocities in opposite directions, or both phases may be allowed to travel with different velocities in the same direction.

According to the present invention I provide a method of separating mixtures of substances by counter-current distribution between two liquid immiscible phases, in which the mixture is introduced into at least one of the phases and the two phases are brought into intimate contact for the purpose of adjusting the partition equilibrium in a plurality of adjacently arranged, contiguous chambers or zones communicating with each other through apertures, whilst maintaining a substantially uninterrupted phase interface in the individual chambers, the phase interface being continuously renewed in the individual chambers by maintaining a constant movement within the individual phases, at least one of the phases being allowed to flow in horizontal direction from one chamber to the next.

The intimate contact of the phases in the chambers is necessary for the rapid establishment of the partition equilibrium. This part of the process may be compared with the shaking of two phases in the separating funnel where, by the vigorous movement, both phases are split up within each other in the form of drops and thus brought into intimate contact. In this kind of intimate contact due to the production of drops, comparable with the production of a more or less coarsely dispersed emulsion, the phase interface is very intensely sub-divided. In contrast to the above, according to the present new process, the intimate contact is brought about whilst maintaining a substantially unbroken, continuous phase interface, i. e. without appreciable portions of the phases being split up within each other in the form of drops. This kind of intimate contact or vigorous mixing of the phases has hitherto not been applied in the comparable counter-current extraction apparatus, obviously because it was assumed that a sufficiently rapid establishment of the partition equilibrium is only attainable by an intense sub-dividing of the phase interface. From the following description of practical embodiments of the apparatus according to the invention and the examples of carrying out the process according to the invention, it is manifest that this kind of phase mixing, which is novel as far as counter-current extraction is concerned, is technically simple to carry out and is highly effective.

It was not to be foreseen, and in fact it is surprising, that the new mode of operation makes it possible for the partition equilibrium of the substances dissolved in the phases to be rapidly established in each individual chamber by adequate renewal of the phase interface and for the cleanly separated phases to flow into adjacent chambers. The distribution of the dissolved substances between the phases and the separation of the phases is thus carried out simultaneously in each individual chamber. Compared with most counter-current extraction apparatus known hitherto, in which two different pieces of apparatus are required for mixing and for separating, this means a considerable simplification. A further considerable advance is obtained by the intense renewal of the phase interface, without appreciable portions of one phase being divided up in the other one in the form of drops. The result is, that the clean separation and clean advancing of the phases is extremely facilitated and the formation of troublesome emulsions is made practically impossible.

The apparatus intended for carrying out the process according to the invention comprises a container which is sub-divided by transverse partitions into a plurality of practically horizontal chambers which are in communication with each other by one or more apertures arranged in each partition, means for introducing two liquid immiscible phases into the container, means for discharging these phases at separate places in the container and means for introducing the mixture to be separated into a chamber of the container.

Figure 10:
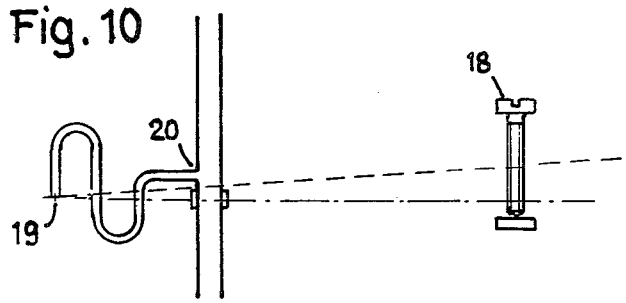

Below are described two practical embodiments of the apparatus according to the invention with reference to the accompanying drawings, in which, Fig. 1 is a schematic longitudinal section through the first embodiment of the apparatus, Fig. 2 is a cross-section to Fig. 1, Fig. 3 is a schematic longitudinal section through a second embodiment of the apparatus, Fig. 4 is a cross-section on the line A—A, Fig. 5 is a cross-section on the line B—B and Fig. 6 is a cross-section on the line C—C in Fig. 3, Figs. 7 and 8 are longitudinal sections supplementary to Fig. 3, Fig. 9 is a cross-section through a device for charging the apparatus with the mixture to be separated, and Fig. 10 is an arrangement of an outlet device.

In Fig. 1, 1 is a horizontal hollow cylinder rotatable about its axis and subdivided into a plurality of chambers by transverse partitions 2. The transverse partitions are provided with small apertures 2a. The heavier phase is denoted by 3 and the lighter phase by 4. 5 is a funnel for continuously introducing the heavier phase into the left-hand end chamber of the cylinder. 6 is a siphon for the leading off the heavier phase from the right-hand end chamber to receiver 7. B is a funnel for continuously introducing the lighter phase into the right-hand end chamber. 9 is a siphon for leading off the lighter phase from the left-hand end chamber to the receiver 10. 11 is a funnel for continuously introducing the mixture to be separated into a central chamber of the cylinder.

In Fig. 2, the reference numerals 2, 3 and 4 designate parts corresponding to those of Fig. 1.

When working, the apparatus shown in Figs. 1 and 2 operates in such a way that through the funnel 5 the heavy phase 3 flows continuously into the left-hand end chamber and flows out through the siphon 6 into the receiver 7, whilst through the funnel 8 the lighter phase 4 flows continuously into the right-hand end chamber and flows through the siphon 9 out of the left-hand end chamber. Thus the two phases are each divided into a plurality of parts and traverse the cylinder throughout its entire length in opposite directions by flowing through the communication-restricting apertures 2a from one chamber into the next. The cylinder 1 rotates slowly about its axis. This rotation results in a complicated arcuate agitation movement of the two phases in a plane substantially perpendicular to the axis of the agitator, i. e. the cylinder, thus causing a continuous intensive new formation of the interface between the two phases, without producing an emulsification of the two phases. The mixture to be separated flows continuously through the funnel 11 into a central chamber of the cylinder. Due to the movement in the two phases, the components of the mixture are distributed between the two phases according to the partition coefficients between the heavy and light phases. The partition equilibrium very rapidly establishes itself owing to the movement in the liquid phases. A given component of the mixture is enriched predominently in one or other of the receivers 10 and 7 according to its partition coefficient between the two phases and the speed of flow of the phases.

In the embodiment of the apparatus according to the invention illustrated in Fig. 3, the cylinder 1 is likewise arranged horizontally and sub-divided into chambers by transverse partitions 2. The transverse partitions 2 are provided with apertures 2a giving passage to the phases, of which the heavier one is denoted by 3 and the lighter one by 4. In this case however the cylinder 1 is arranged to be stationary. Each chamber contains a rotatable disc 12, on which baffles (not shown) can also be arranged. The discs 12 of all chambers are mounted on a spindle 13 rotatably mounted in the axis of the cylinder.

The heavy phase is delivered through the funnel 5 (Fig. 4) into the first chamber of the cylinder and let out of the last chamber into the receiver 7 by means of the siphon 6 (Fig. 5). The light phase passes through the funnel 8 (Fig. 5) into the last chamber of the cylinder and is delivered into the receiver 10 out of the first chamber of the cylinder by the siphon 9 (Fig. 4).

The mixture to be separated is continuously introduced through a funnel 11 (Fig. 6) laterally arranged on the cylinder at a suitable place.

The speed of rotation of the agitator discs 12 on the spindle 13 is kept so low that substantially no drops of one of the two phases are formed in the other one. In order to observe this, sight glasses 14 (Fig. 3) are provided in the end faces of the cylinder. They also enable the level of the two phases to be observed.

Even at a low speed of rotation at which there is still no release of drops and no emulsifying of one phase in the other, the rotating discs 12 bring about an astonishingly rapid adjustment of the partition equilibrium of each dissolved molecule type in each chamber.

This very favourable action of the discs is due to two reasons. In the first place a rapid liquid movement takes place in both phases in the vicinity of the phase interface, so that new volume elements of both liquids repeatedly come into contact with each other. Then again, that one of the two phases which has the higher wetting power with respect to the material of the disc, clings to the disc in a thin film and is drawn along an arcuate path in a vertical plane through the other phase.

The apertures from chamber to chamber in the transverse partitions are made sufficiently large to prevent any appreciable congestion or damming back of the phases. In the first embodiment of the apparatus with the rotating cylinder in accordance with Figs. 1 and 2 the number and magnitude of the apertures may be varied and chosen in accordance with the viscosity and speed of flow of the phases. In the embodiment with the stationary cylinder and rotating discs according to Figures 3–6, those surface portions in the partitions contacted by the individual phases may be provided with one or more openings, the size of which is also chosen in accordance with the viscosity of the phases and their velocity of flow. On the other hand, one or more openings may be provided in only one of the surface portions against which the phases make contact, so that one phase is at rest whilst the other phase flows.

When the openings are large, the phase interfaces in all chambers are practically at the same level as indicated in Figs. 1 and 3. With very small openings and high speeds of flow, the phase level in the various chambers disposes itself as shown in Fig. 7. In this case the lighter phase flows from the left to the right and the heavier one from the right to the left. The counter-current flow of the two phases—and consequently the proper functioning of the apparatus—ceases. The openings must therefore be enlarged to such an extent that both phases are present in sufficiently high layers in the two end chambers of the cylinder to permit them to be drawn off by the siphons.

When large openings are used, the damming of the phases can be easily avoided completely but the separating efficiency of the apparatus falls off rapidly. A prejudicial equalisation of concentration between adjacent chambers takes place through the large openings. The number and size of the openings is correctly set to the viscosity and speed of flow of the phases when the bottom phase is in a slightly stepped formation. Good results are obtained, if the level of the bottom phase at the end where it flows into the cylinder is about two thirds of the total height of both phases and about one third of the total height of both phases at the outflow end.

In the example with the stationary cylinder and rotating discs according to Fig. 3, the phase damming may be counteracted by a slight inclining of the axis of the agitating discs with respect to the axis of the cylinder in the horizontal plane. Fig. 8, which is a plan view, shows such an arrangement in which the axes form the angle α. The agitating discs are now no longer arranged parallel with the chamber walls and they therefore give rise to a pump action which transmits itself from one chamber to the other. This pump action depends amongst other things, on the speed of rotation, the dimensions of the chambers, the viscosity of the phases, etc. By a suitable choice of the angle α, it is possible to compensate the phase damming empirically when the openings in the transverse partitions are very small in size. This gives the apparatus an effective number of stages amounting to almost 100% of the effective number of chambers.

Whilst preserving the fundamental idea of the invention, the individual parts of the apparatus may be very differently constructed. The number of chambers may be large or small. When the partition coefficients of the components of a mixture are very different, a small number of chambers is sufficient to produce complete separation. If the partition coefficients are similar, a large number of chambers is necessary. The chambers may all be disposed at the same level or slightly stepped. The dimensions of the apparatus depend upon the quantities of mixture to be separated per unit of time. For small quantities, chamber volumes of a few $cm.^3$ are sufficient. For large quantities, chamber volumes of several litres are necessary. Even with phases of considerable depth, e. g. of several dms., the partition equilibrium still establishes itself very rapidly owing to the continual renewal of the phase interface. The agitators may take the form of propellers with a slight pitch. This results in a pump action which diminishes the phase damming. It is also possible to employ double propellers with different effective radii. One propeller dips only into the upper phase and produces a movement in one direction. The other propeller has a large radius and gives rise to a movement in opposite direction in the lower phase.

The process according to the invention may be carried out in a diversity of ways.

The mixture to be separated may be introduced continuously into a chamber placed either in the middle of the cylinder or more or less towards one or the other end of same. The mixture is then separated continuously into two fractions, each of which is dissolved in a respective phase, emerging at one corresponding end of the apparatus.

The dividing up of the molecule types in the two fractions depends on their partition coefficients in the two phases, the volumes of the two phases in each chamber, the speed of flow of the two phases, the total number of the chambers and the place where the mixture is introduced. A suitable arrangement for introducing the mixture to be separated is shown in Fig. 9. A vessel 15 contains the solution of the mixture in the heavier phase. The vessel 15 is connected to a chamber of the cylinder by means of the tubes 16 and 17. If the density of the mixture is different from that of the dissolving phase, a circulation of the solution from the vessel 15 to the chamber and from the latter back to the vessel, takes place. The arrows in Fig. 9 indicate the direction of movement in the case in which the density of the mixture to be separated is higher than that of the dissolving phase. The dissolved material distributes itself partially in the two phases and is moved through the cylinder whilst the remaining portion of the dissolved material returns into the vessel. The circulation continues until the concentration of the mixture to be separated in the phase has become infinitesimally small in the vessel 15.

When this mode of introducing the mixture is employed, the rate of flow of that phase in which the mixture is introduced, remains constant through the entire cylinder. This is not the case with the method of introduction indicated in Fig. 1.

A simpler method of introducing the mixture is provided by using a funnel 11, as illustrated in Fig. 6. The mixture may be added in the dry state or as a more or less concentrated solution in the corresponding phase.

The new extraction process may also be used to enable a mixture of several components with different partition coefficients to be separated successively into its individual components. This application of the invention is analogous to the method in which a mixture of many components with different boiling points is separated by means of a distillation column, in which the most volatile components are separated off first of all and then the second most volatile, and so on.

The mixture, dissolved in one phase, is allowed to flow out of a container, for example of the kind shown in Fig. 9, into the corresponding phase in the first chamber of the apparatus and it is pumped out of this chamber back again into the container. A continuous circulation of the dissolved mixture from the container to the first chamber and from the latter back to the container is maintained.

The cylinder is continuously traversed from the last to the first chamber by fresh quantities of the same phase as is used for dissolving the mixture to be separated, so that the total volume of liquid in circulation from the chamber to the container and back, is increased. In order to maintain a constant volume of fluid, it is therefore necessary to interpose in this circulation a means for continuously removing (for example by evaporation) as much of the phase as flows in through the cylinder.

The second phase flows from the first chamber to the last chamber of the cylinder and passes from the latter into a receptacle.

The greater the ratio of the rate of flow of the phase flowing towards the mixture to be separated with respect to the phase flowing towards the receiver, the smaller is the probability that a component with a particular partition coefficient should pass into the receiver. If this ratio of speeds of flow varies from ∞ through 1 to 0, all components pass successively into the receiver. The sharpness of separation naturally depends upon the number of chambers and the difference between adjacent partition coefficients.

If small quantities of a mixture are to be separated the process can be carried out very simply with a flowing and a stationary phase. The entire mixture is introduced once and for all into one of the two end chambers in the stationary phase. The flowing phase is introduced into this same end chamber so that the various components of the mixture in the flowing phase successively emerge, cleanly separated, from the other end chamber, provided that the number of chambers is sufficiently large and the partition coefficients of the components are sufficiently far apart.

With this mode of operation it is expedient to saturate the flowing phase with the stationary phase before entry into the apparatus.

The speeds of flow of both phases must be varied within wide limits according to the separation to be carried out. In order to keep the speeds of flow constant during an entire separation operation it has been found practical to effect the inflow into the funnels 5 and 8 (Figs. 1 and 5) out of Mariotte-flasks. With the latter, by a suitable choice of the hydrostatic pressure and the resistance in the outlet tube of the Mariotte-flask, it is possible to vary the rate of flow within wide limits and to keep it constant.

In the case of apparatus with a large number of chambers, particular care must be given to the level of the two phases. It is ensured by the correct positioning of the siphons 6 and 9 (Figs. 1, 4 and 5). It has been found practicable to operate the fine adjustment of the siphons with an arrangement as shown in Fig. 10. The siphon 20 is secured to a screw-adjusted lever 18 whose fulcrum 19 is situated at the immersion end of the siphon. When the screw 18 of the siphon is operated the immersion end of the siphon remains stationary whereas the outlet end 20 is raised or lowered by a very little distance.

When there are considerable temperature fluctuations, fine droplets from one phase separate out into another phase. The result is that the sharpness of separation suffers. It is therefore of advantage to operate at constant temperature.

The excellent separation effects which are attainable with the new process are comparable with the results of paper chromatography. Compared with this method, which is now much in use and is very efficient from the point of view of separating action, the method according to the invention has the advantage that it is very suitable for separating larger quantities of substances for preparatory work in the laboratory and for operations on an industrial scale.

In order that the invention may be well understood, the following examples are given only as illustrations:

EXAMPLE 1

*Separating a mixture of leucine and valine with butanol/water*

Apparatus with stationary cylinder and discs as stirring members (in accordance with Fig. 3).

Number of chambers: 13.
Length of cylinder: 10 cm.
Radius of cylinder: 5 cm.
Speed of stirring discs of 4.8 cs. radius: 20 revolutions per min.

Apertures in partitions: 2 circular orifices of 0.5 mm. radius in those surface portions of the chamber partitions with which the upper phase comes in contact. The lower phase does not flow. There are no apertures in those surface portions of the partitions with which the lower phase comes in contact.

Upper phase: 10 ccs. butanol, saturated with water, in each chamber. Rate of flow: 60 ccs./hr.

Lower phase: 2 ccs. water, saturated with butanol, in each chamber. Rate of flow: 0 ccs./hr.

Mixture: 0.089 millimol leucine and 0.122 millimol valine, fed at once into the first chamber.

Fractions of 10 ccs. are caught. The concentration of leucine and valine in the butanol will be apparent from the following:

| Fractions | Quantities of amino acids | | | |
|---|---|---|---|---|
| | Leucine | | Valine | |
| | Millimol | Percent with respect to the quantity present in the starting mixture | Millimol | Percent with respect to the quantity present in the starting mixture |
| 0–140 ccs | 0 | 0 | 0 | 0 |
| 140–300 ccs | 0.037 | 42 | 0.005 | 4 |
| 300–400 ccs | 0.041 | 46 | 0.026 | 21 |
| 400–500 ccs | 0.010 | 11 | 0.041 | 34 |
| 500–600 ccs | 0.001 | 1 | 0.032 | 26 |
| 600–700 ccs | 0 | 0 | 0.014 | 12 |
| 700–800 ccs | 0 | 0 | 0.004 | 3 |
| total | 0.089 | 100 | 0.122 | 100 |

Taking the partition coefficients (concentration in the butanol to concentration in the water), 0.136 for leucine and 0.072 for valine, and the volume ratio of 10 ccs. upper phase to 2 ccs. lower phase, and assuming a discontinuous shaking with 10 and 13 separating funnels respectively, the figures of the following table have been computed. These being compared with the observed values of this example.

| Fractions | Leucine in millimol | | | Valine in millimol | | |
|---|---|---|---|---|---|---|
| | No. of funnels | | observed | No. of funnels | | observed |
| | 10 | 13 | | 10 | 13 | |
| 240–270 ccm | 0.016 | 0.013 | 0.013 | 0.009 | 0.001 | 0.002 |
| 370–400 ccm | 0.001 | 0.008 | 0.009 | 0.013 | 0.009 | 0.009 |
| 480–510 ccm | 0.000 | 0.001 | 0.001 | 0.006 | 0.012 | 0.012 |

Within the limits of error, the observed concentrations of both amino acids agree with those computed for 13 separating funnels. However when 10 separating funnels are used, considerable differences occur between the observed and computed values. The apparatus of Example 1 thus operates with an effectual chamber number of over 90% of the 13 effective chambers.

It is easy to construct apparatus with a much greater number of chambers than 13. With a chamber number of 40, the separation of leucine and valine is complete. First of all the entire leucine passes into the receiver, then the amino acid concentration in the emerging butanol sinks to zero. Thereupon the valine comes out.

EXAMPLE 2

*Separating a mixture of leucine and alanine with phenol/water*

Apparatus with stationary cylinder and discs as stirring members, as in Example 1.

Speed of discs: 14.5 revolutions per min.

Apertures in the partitions: 1 circular orifice of 0.5 mm. radius in those surface portions with which the upper phase comes into contact.

Upper phase: 4.5 ccm. water, saturated with phenol, in each chamber, rate of flow 18 ccs./hr.

Lower phase: 6.5 ccm. phenol, saturated with water, in each chamber, rate of flow 0 ccm./hr.

Mixture: 50 mg. leucine and 50 mg. alanine are fed at once into the first chamber.

Fractions of 5 ccm. are caught. After 50 ccm. of the upper phase have flowed out of the apparatus, pure alanine emerges. In the fractions 50–70 ccm. there are 15 mg. of alanine free from leucine. In the fraction 100–105 ccm. both amino acids are to be found in the same concentration. With 155 ccm., the entire alanine is washed out of the apparatus. In the fractions 155–195 ccm. these are 20 mg. of leucine, free from alanine.

EXAMPLE 3

*Separating casein into α- and β-casein*

Apparatus with stationary cylinder and discs as stirring members, as in Example 1.

Speed of stirring discs: 3 revolutions per minute.

Apertures in the partitions: 1 circular orifice of 0.5 mm. radius in those surface portions with which the lower phase makes contact.

Phases: 4 parts by volume of water, 7 parts by volume of glacial acetic acid, 3 parts by volume of phenol, saturated with water, 5 parts by volume of acetylene tetrachloride yield a two-phase system with very low interfacial tension.

Upper phase: 8 ccm. in each chamber, rate of flow: 0 ccm./hr.

Lower phase: 3 ccm. in each chamber, rate of flow: 4 ccm./hr.

Mixture: 100 mg. casein according to Hammarsten, fed at once into the first chamber.

Fractions of 5 ccm. are caught. With the fractions from 40–75 ccm., pure β-casein emerges in a total quantity of 14 mg., the maximum concentration occurring in the fraction 55–60 ccm. With the fractions from 80–200 ccm., pure α-casein emerges, the maximum concentration occurring in the fraction 105–110 ccm. The separation of the casein into α- and β-casein could hitherto only be accomplished by two tedious methods which are both unsuitable for the production of considerable quantities of α- and β-casein. On the one hand, small quantities of casein may be split up electrophoretically. On the other hand, α- and β-casein may be collected by repeated fractionated precipitation. The method described in Example 3 supplies both caseins in pure form in one operation.

EXAMPLE 4

*Continuous counter-current extraction of a concentrated albumen hydrolysate with butanol/water*

Apparatus as in the Examples 1–3.

Speed of the stirring discs: 27 revolutions per minute.

Openings in the partitions: 1 circular aperture of 0.5 mm. radius both in those surface portions bounding the lower phase as well as in those bounding the upper phase.

Upper phase: Butanol, saturated with water, rate of flow: 45 ccm./hr.; delivered from Mariotte-flask.

Lower phase: Water, saturated with butanol, rate of flow: 7 ccm./hr.; delivered from Mariotte-flask.

Mixture: Albumen hydrolysate which is introduced from a large container, as in Fig. 9, connected to the seventh chamber. Initial concentration of the circulating mixture: 30 g. amino acids and 10 g. sodium chloride in 100 ccm.

Butanol fraction: Pure phenylalanine.

Aqueous fraction: Little phenylalanine, together with all other amino acids and common salt. Dry content: 9 g. in 100 ccm.

EXAMPLE 5

*Continuous counter-current extraction of a diluted albumen hydrolysate with butanol/water*

Apparatus, phases and mixture to be separated, as in Example 4. This mixture has a 20 times lower concentration than the mixture according to Example 4.

In the butanol fraction is to be found all the phenylalanine and leucine of the hydrolysate and half of the valine. The other half of the valine and all the more water-soluble amino acids together with the common salt emerge with the aqueous phase. The dry content of the aqueous phase amounts to 0.6 g. in 100 ccm.

EXAMPLE 6

*Dividing up an albumen hydrolysate into three fractions by twice-repeated counter-current extraction with phenol/water*

Apparatus as in the Examples 1–3.

Apertures in the partitions: An opening with 1 mm. radius in those surface portions with which the phenol phase comes into contact, an opening of 0.5 mm. radius in those surface portions with which the aqueous phase comes into contact.

FIRST EXTRACTION

Upper phase: Water, saturated with phenol, rate of flow: 10 ccm./hr.

Lower phase: Phenol, saturated with water, rate of flow: 30 ccm./hr.

Speed of stirring discs: 14 revolutions per minute.

Mixture: Albumen hydrolysate, which is fed from a container as in Fig. 9, connected to the seventh chamber. Volume of the circulating solution 350 ccm. Dry content of the mixture 6.0 g. amino acids and 0.5 g. sodium chloride.

Duration of extraction: 40 hrs. The concentration in the container, out of which the mixture is fed, practically sinks to zero.

Fractions: In the phenol fraction, there are to be found—of the monoamino-monocarboxylic acids—proline, leucine, phenylalanine and valine as well as a portion of the alanine and threonine. In the aqueous fraction there is to be found the other portion of alanine and threonine, as well as the whole of the glycine, serine and all water-soluble amino acids as well as the common salt.

SECOND EXTRACTION

Upper phase: Water, saturated with phenol, rate of flow: 20 ccm./hr.

Lower phase: Phenol, saturated with water, rate of flow: 20 ccm./hr.

Speed of the stirring discs: 11 revolutions per minute.

Mixture: Amino acids of the phenol fraction of the first extraction, dissolved in 50 ccm. phenol; introduction of the mixture into the seventh chamber out of the container according to Fig. 9.

Duration of extraction: 50 hrs. The concentration in the container out of which the mixture is fed, sinks to zero.

Fractions: In the phenol fraction there are to be found—of the neutral amino acids—the proline, leucine, phenylalanine and a portion of the valine, in the aqueous fraction there is to be found the other portion of the valine and the entire alanine and threonine.

EXAMPLE 7

*Dividing up an albumen hydrolysate by counter-current extractions into many fractions with butanol/water*

Apparatus as in Example 1.

Speed of the stirring discs: 27 revolutions per minute.

Apertures in the partitions: 1 circular orifice of 0.5 mm. radius in those surface portions with which the upper phase comes into contact; 1 circular orifice of 0.25 mm. radius in those surface portions with which the lower phase comes into contact.

Upper phase: Butanol, saturated with water.

Lower phase: Water, saturated with butanol.

Mixture: Albumen hydrolysate with 3.8 g. amino acids and 1.2 g. sodium chloride in 100 ccm. lower phase. The mixture circulates from the first chamber to a storage vessel, through a pump, an evaporator and back to the first chamber. Pump and evaporator are of the type described in Helv. Chim. Acta., vol. 29, page 1984 (1946). The butanol phase passes into the first chamber and out of the last one into a receiver. The aqueous phase passes into the last chamber and unites itself with the circulating mixture in the first chamber.

Fractions: Every 24 hours the butanol receiver was changed and its contents analysed. The composition of the fractions and the corresponding rates of flow of the phases will be gathered from the following table:

| No. of fraction | Rate of flow in ccm./hr. | | Amino acids |
|---|---|---|---|
| | Butanol | Water | |
| 1 | 38 | 12 | pure phenylalanine. |
| 2 | 38 | 6 | little phenylalanine, much leucine, trace of valine. |
| 3 | 61 | 6 | trace of phenylalanine, much leucine and valine, little proline. |
| 4 | 61 | 3 | little leucine, much valine, little proline, trace of alanine. |
| 5 | 61 | 1.5 | little valine, much proline and alanine, little water-soluble amino acids. |

The residue in the aqueous phase is free from phenylalanine, valine, leucine. It still contains a very small amount of proline and the water-soluble amino acids together with common salt.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The method of separating at least one substance from a mixture of substances by counter-current distribution between two immiscible liquid phases, where each of said substances in the mixture is soluble in each of said phases and the latter have different partition coefficients with respect to at least said one substance; comprising the steps of dividing both said liquid phases into a plurality of respective adjacent parts, each part of a first phase being in restricted communication with at least one other part of said first phase and being further in intimate contact at a substantially uninterrupted interface with a corresponding part of the second phase, introducing into at least one of said phases said mixture of substances, imparting to at least one of said phases a flow movement in a predetermined direction, and concurrently imparting to each of said parts of both said phases an arcuate movement in a direction substantially transverse to said predetermined direction of flow movement to thereby agitate said parts of said phases while maintaining said interfaces therebetween in substantially uninterrupted condition, whereby said one substance is transferred from said one phase into which said mixture was introduced to the other phase while the remaining substances of said mixture are retained in said one phase.

2. The method of separating at least one substance selected from the group consisting of naturally occurring amino acids and proteins from a mixture of said substances by counter-current distribution between a plurality of immiscible liquid phases, where each of said substances in the mixture is soluble in each of said phases and the latter have different partition coefficients with respect to at least said one substance; comprising the steps of dividing said plurality of liquid phases into a plurality of respective adjacent parts, each part of a first phase being in restricted communication with at least one other part of the same phase and being further in intimate contact at a substantially uninterrupted interface with a corresponding part of a second phase, introducing into said first phase said mixture of substances, agitating each of said parts of said first phase in a first direction jointly with corresponding parts of said second phase to such an extent only as to thereby prevent splitting up of said phases into drops and to simultaneously effect a continuous renewal of said interface, thus maintaining said interface in substantially uninterrupted condition, and imparting to at least one of said phases during agitation a flow movement in a second direction substantially transverse to said first direction, whereby said one substance is transferred from said first phase to said second phase while the remainder of said mixture is retained in said first phase.

3. The method according to claim 2, said second direction of said flow movement being horizontal, and said agitating step comprising the step of imparting an arcuate movement to each of said parts of said phases in a plane substantially perpendicular to said second direction.

4. The method according to claim 2, including the step of controlling said flow movement of said first and second phases in opposite directions.

5. The method according to claim 2, including the step of guiding said flow movement of both said first and second phases in the same direction, one of said phases being moved with a greater speed than the other of said phases.

References Cited in the file of this patent

UNITED STATES PATENTS

| | | |
|---|---|---|
| 608,554 | Moodie | Aug. 2, 1898 |
| 1,893,667 | Darlington | Jan. 10, 1933 |
| 2,218,080 | Bottaro | Oct. 15, 1940 |
| 2,224,201 | Siedle | Dec. 10, 1940 |
| 2,391,110 | Walker | Dec. 18, 1945 |
| 2,471,053 | Almquist | May 24, 1949 |
| 2,517,601 | Shafor | Aug. 8, 1950 |
| 2,556,213 | Pierotti et al. | June 12, 1951 |
| 2,556,228 | Souders | June 12, 1951 |
| 2,562,221 | Tour | July 31, 1951 |
| 2,599,633 | Hoffmeister et al. | June 10, 1952 |
| 2,599,836 | Johnson | June 10, 1952 |
| 2,601,674 | Reman | June 24, 1952 |
| 2,629,654 | Olney | Feb. 24, 1953 |